United States Patent

[11] 3,584,304

[72] Inventors Burnham Casterline
Des Plaines;
Ronald H. Chapman, Wheaton, both of, Ill.
[21] Appl No 832,078
[22] Filed June 11, 1969
[45] Patented June 8, 1971
[73] Assignee Motorola Inc.
Franklin Park, Ill.

[54] SQUELCH TAIL ELIMINATOR FOR DUAL SQUELCH
10 Claims, 2 Drawing Figs.

[52] U.S. Cl. .......... 325/348, 325/466, 325/478, 343/228
[51] Int. Cl. .......... H04b 1/10
[50] Field of Search .......... 325/64, 319, 348, 392, 402, 466, 473, 478, 480; 340/171; 343/228

[56] References Cited

UNITED STATES PATENTS

| | | | |
|---|---|---|---|
| 3,250,999 | 5/1966 | Cole | 325/348 |
| 3,397,401 | 8/1968 | Winterbottom | 325/64 |
| 3,496,467 | 2/1970 | Lundgren | 325/64 |

*Primary Examiner*—Robert L. Griffin
*Assistant Examiner*—James A. Brodsky
*Attorney*—Mueller, Aichele & Rauner

ABSTRACT: A radio receiver which incorporates dual squelch systems, one system operated by the carrier and the other operated by a coded tone signal, is responsive to the tone signal of the proper frequency to operate the tone coded squelch system and temporarily disable the carrier squelch system when the receiver is in the carrier squelch mode. By permitting the tone coded squelch system to disable the carrier squelch when the proper tone signal is received, noise bursts or squelch tails at the end of a transmission are eliminated.

Inventors
BURNHAM CASTERLINE
RONALD H. CHAPMAN
BY
Mueller, Aichele & Rauner
ATTYS.

SQUELCH TAIL ELIMINATOR FOR DUAL SQUELCH

BACKGROUND OF THE INVENTION

In many communication receivers a dual squelch system is incorporated in order to provide a receiver which is only responsive to the signals directed particularly to it. The dual squelch system incorporates a normal carrier operated squelch system and a tone coded squelch system responsive only to a tone of a particular frequency or group of frequencies. In order to provide proper squelch operation the carrier squelch portion of the dual squelch system is delayed in its operation and therefore, when the carrier ceases the receiver remains unsquelched for a short period of time and an annoying noise burst or squelch tail can be heard. With the tone coded duel squelch system operating, it is possible to eliminate the squelch tail by continuing the carrier for a short period of time after the code tone stops. By this action the receiver is squelched before the carrier ceases and no annoying noise burst can be heard.

It is an FCC requirement that communication system operators listen to the communication channel before transmitting so that indiscriminate transmissions will not interfere with the use of the channel by others. Thus, many communications systems cause the receiver to transfer automatically to the carrier squelch mode of operation when the operator removes the microphone from its hook. Since the carrier squelch system is operative, the receiver is subject to the squelch tail interference even though tone coded squelch signals which can be used to eliminate the squelch tails are being transmitted.

SUMMARY OF THE INVENTION

It is, therefore, an object of this invention to provide an improved squelch system for a communications receiver.

It is another object of this invention to provide a squelch system for coded tone squelch and carrier squelch operation which responds to a tone of proper frequency to hold the carrier squelch system ineffective for a period following cessation of the tone to provide squelch tail elimination.

In practicing this invention a switch is provided which is responsive to the tone squelch control signal to render the carrier squelch system ineffective during the presence of the tone squelch control signal and for a short period of time after the cessation of transmission so that the carrier squelch system cannot operate to unsquelch the receiver for the short period of time that the carrier is present and the tone is not present.

The invention is illustrated in the drawings of which:

DETAILED DESCRIPTION OF THE INVENTION

Figures 1, 2:
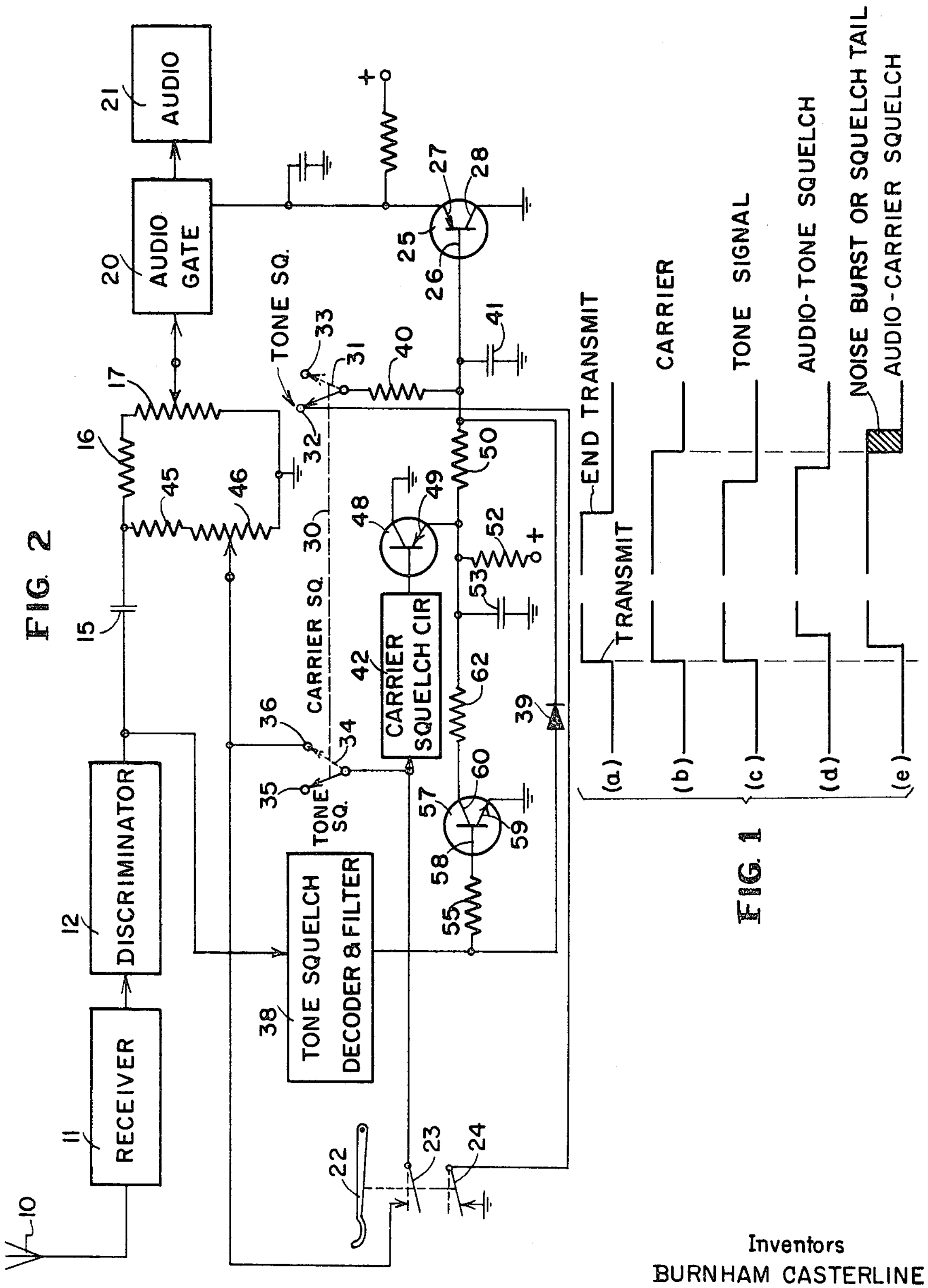
FIG. 1 is a timing diagram showing the operation of the squelch systems.
FIG. 2 is a partial block diagram and partial schematic of a receiver squelch system incorporating the features of this invention.

Referring to FIG. 1, there is shown a timing diagram illustrating the operation of a dual squelch receiver. Curve (a) shows the time interval during which the communication system is in a transmitting mode as initiated by the operator. Curve (b) shows that the carrier is transmitted from the beginning of the transmit mode interval and for a short period of time after the end of this interval. The duration of transmission of the tone signal in a tone coded squelch system is shown by curve (c). It can be seen that the carrier continues for a short period of time after the tone signal ceases. In curve (d) the period of time during which the audio circuits are operative with tone coded squelch is shown. Because of the time delays necessary for proper operation of the squelch system, it is seen that the audio circuits are operative for a short period of time after the end of the tone signal. However, the carrier continues beyond the time that the audio circuits are operative so that no annoying noise burst is heard at the end of the transmission. In curve (e) the time during which the audio circuits are operative with carrier squelch is shown. It can be seen that the carrier squelch does not cause the audio circuits to become inoperative until a short period of time after the end of the carrier signal, and it is during this short time interval that noise can be heard, resulting in the noise burst or squelch tail.

Referring to FIG. 2, there is shown a partial block diagram and partial schematic of a communications receiver having the squelch tail elimination feature of this invention. Signals received by antenna 10 are processed in receiver 11 and applied to discriminator 12. Discriminator 12 develops audio signals which are coupled through capacitor 15, resistor 16, volume control 17 and through audio gate circuit 20 to the audio circuits 21. Audio gate circuit 20 is responsive to an enabling voltage applied thereto to couple the audio signals to the audio circuit 21 for reproduction. In the absence of the control signal the audio gate 20 blocks the audio signals from audio circuits 21.

The enabling signal for audio gate 20 is developed by transistor 25. When transistor 25 conducts the voltage at emitter 27 is reduced and this reduction in voltage biases the audio gate circuit to nonconduction. When transistor 25 is biased to nonconduction the potential on emitter 27 rises and this rise in potential, coupled to audio gate circuit 20, enables the gate circuit. The bias voltages for biasing transistor 25 to conduction and nonconduction are supplied by the squelch circuits.

In the circuit shown, a hook switch 22 is provided which is held in the downward position when a microphone is hung thereon, and which is spring biased to an upper position when the microphone is removed. The switch 22 has normally open contacts 23 and normally closed contacts 24. A manual switch 30 is also provided on the control head for the receiver which has a first position shown in solid lines wherein the squelch system operates in the tone only squelch mode, and a second dotted position wherein the receiver operates in both the tone and carrier squelch modes. It will be noted that the contact 36 and switch arm 34 of the switch 30 on the control head is in parallel with the contacts 23 of the hook switch, and that the switch contacts including arm 31 on the control head is in series with the switch including contacts 24 of the hook switch.

With switch 30 in the tone squelch position, and the microphone on the hook switch to hold it in the lower position, the base 26 of transistor 25 is connected to ground through resistor 40, switch arm 31 and contact 32, and contacts 24. Switch arm 34 is connected to contact 35, which is an open contact, and contacts 23 are also open, so that the carrier squelch circuit 42 does not receive an input signal and is inoperative. The tone squelch decoder and filter 38 receives an input from the discriminator 12 and is responsive to a tone signal or signals at the proper frequency to develop an output voltage. This output voltage is applied through diode 39 to base 26 of transistor 25, biasing this transistor to nonconduction. When the tone signal ceases, the bias voltage is removed and transistor 25 is again biased to conduction. The charge accumulated on capacitor 41 delays the conduction of transistor 25 so that the audio gate 20 is not inhibited immediately. However, the delay caused by the time constant of capacitor 41 and resistor 40 is less than the time that the carrier remains on after the end of the transmission, so that when the audio circuits are rendered inoperative no noise is present to develop a squelch noise tail.

With the switch 30 in the tone and carrier squelch position (dotted), regardless of the position of the hook switch 22, the carrier squelch circuit 42 receives an input noise signal from discriminator 12 through resistors 45 and 46, contact 36, and contact arm 34. The noise signal is amplified and detected in carrier squelch circuit 42 and applied to transistor 48, biasing transistor 48 to conduction. The carrier squelch circuit 42 is frequency selective so that only noise signals are detected and used to develop the potential for biasing transistor 48 to conduction. With transistor 48 biased to conduction, the voltage drop through resistor 52 causes the potential at emitter 49 to drop. This drop in potential, applied through resistor 50 to base 26 of transistor 25, biases transistor 25 to conduction to develop a voltage for disabling audio gate 20 to block the audio signals. With the carrier present, the noise output of the carrier squelch circuit 42 drops and transistor 48 is biased to nonconduction causing the potential on emitter 49 to rise. This rise in potential is coupled through resistor 50 to base 26 of transistor 25 biasing transistor 25 to nonconduction and thus supplying the enabling voltage to audio gate 20. When the carrier signal ceases, transistor 48 is again biased to conduction causing the potential on emitter 26 to drop, thereby biasing transistor 25 to conduction and again disabling the audio gate 20. However, this action is not instantaneous since the squelch circuit would not operate properly if it were. Charges stored in capacitor 53 maintain transistor 25 in a nonconductive state for a short period of time after the end of the carrier signal so that the audio circuitry is operative for this short period of time. However, since no carrier signal is present at this time the receiver picks up noise and this results in a noise burst or squelch tail.

In the circuit shown, the hook switch 22 acts to shift the squelch system from tone coded squelch only operation to tone and carrier squelch operation when the operator removes the microphone to make a transmission. As the contact 23 of the hook switch 22 is in parallel with the switch contacts 34 and 36 of the switch 30, when the microphone is removed from the hook switch 22, contacts 23 close to apply signals to the carrier squelch circuit 42 to provide the operation described above. This meets the FCC requirement that the operator monitor the channel by listening to the receiver before transmitting to make sure the channel is not being used. If the receiver remained in the tone coded squelch only mode, persons using the channel but not transmitting the tone coded squelch signal would not be heard by the operator since the receiver would respond only to a transmission with the tone coded signal.

When the squelch is shifted from the tone coded squelch system to the carrier squelch system, either by operation of the switch 30 or by removal of the microphone from the hook switch 22, squelch tails will be generated despite the fact that the tone coded signals are being transmitted and detected by the receiver. Referring to FIG. 2, it can be seen that with the carrier present, the potential on emitter 49 of transistor 48 will rise to a value sufficient to bias transistor 25 to nonconduction. The potential on emitter 49 is stored in capacitor 53 and thus when the tone coded squelch signal is removed, the potential on emitter 49 is still sufficient to maintain transistor 25 in the nonconducting condition. Further since capacitor 53 is already charged there is no delay in the application of this potential from emitter 49 to the base 26 of transistor 25. Thus when the carrier ceases, the delay in disabling the audio gate 20 will cause a squelch tail to be developed.

In order to prevent this condition, the circuit including transistor 57 is provided. The base 58 of transistor 57 is coupled to the tone squelch decoder and filter 38 through resistor 55 to receive the tone decoder output signal. This signal acts to bias transistor 57 to conduction so that the potential on emitter 49 of transistor 48 is coupled to ground through resistor 62, collector 60 and emitter 59 of transistor 57. This provides a path for current flow from positive supply to ground and reduces the potential across capacitor 53 connected to emitter 49 below that which is required to bias transistor 25 to nonconduction. When the tone signal stops, this causes the bias on transistor 25 to change so that transistor 25 conducts inhibiting audio gate 20. Transistor 48 is biased to nonconduction because of the absence of noise, and the potential on emitter 49 of transistor 48 begins to rise. This rise in potential is delayed because of the time constant of resistor 52 and capacitor 53. This time constant is made sufficiently large so that the carrier is removed before transistor 25 is biased to nonconduction. Thus transistor 57 acts to prevent operation of the carrier squelch system when a tone coded squelch signal is received, so that squelch tails are eliminated.

Therefore, when the microphone is removed from the hook switch 22, or the switch 30 is moved to the carrier squelch position to monitor the channel, the tone coded squelch circuit operates to disable the carrier squelch system during the period that the tone is present and for a short period after until the noise actuates the same to cut off the audio by action of the audio gate 20. This prevents the reproduction of this noise which causes what has been termed a squelch tail.

It will be apparent that either the hook switch 22, or the control head switch 30 can be removed, and the desirable squelch tail or noise burst elimination can be obtained. In the event that the hook switch 22 is not used it is merely necessary to provide a jumper across the connections completed by contacts 24 so that the terminal 32 is always connected to ground. If the switch 30 is not used, a jumper can be place across the circuit connected to contacts 31 and 32 so that the resistor 40 is directly connected to the contacts 24 and will be grounded when these contacts are closed.

We claim:

1. A squelch circuit for a receiver including a first portion adapted to receive a tone and audio modulated carrier signal and to develop audio signals and a tone signal therefrom, said circuit including in combination, an audio portion coupled to the first receiver portion for reproducing the audio signals, said audio portion being adapted to be enabled in response to an enabling signal applied thereto, carrier squelch means coupled to the first portion and responsive to the carrier signal to develop a first control signal, tone coded squelch means coupled to the first portion and responsive to the tone signal to develop a second control signal, enabling signal means coupled to said audio portion and to said carrier squelch means and said tone coded squelch means, said enabling signal means providing an enabling signal in response to any one of said first and second control signals, and control means coupling said tone coded squelch means to said carrier squelch means and responsive to said second control signal to develop an inhibit signal and apply the same to said carrier squelch means, said carrier squelch means being responsive to said inhibit signal to be thereby rendered inoperative to develop said first control signal.

2. The squelch circuit of claim 1 wherein said control means includes memory means for holding said carrier squelch means inoperative for a given time period.

3. The squelch circuit of claim 1 wherein, said control means acts in response to said second control signal to clamp the output signal from said carrier squelch means to a reference potential.

4. The squelch circuit of claim 1 wherein, said audio portion includes audio circuit means and gate means coupling the first receiver portion to said audio circuit means, said enabling signal means being coupled to said gate means for applying said enabling signal thereto, whereby said gate means acts to couple audio signals from the first receiver portion to said audio circuit means.

5. The squelch circuit of claim 4 wherein said control means includes a transistor having first and second electrodes and a control electrode, resistor means coupling said first electrode to said carrier squelch means, means coupling said second electrode to a reference potential, and means coupling said control electrode to said tone coded squelch means for receiving said second control signal, said transistor being responsive to said second control signal to be biased to provide conduction between said first and second electrodes to thereby couple said carrier squelch means to said reference potential through said resistor means.

6. The squelch circuit of claim 5 wherein, said first electrode is a collector electrode, said second electrode is an emitter electrode and said control electrode is a base electrode.

7. The squelch circuit of claim 1 including switch means for selectively connecting said carrier squelch means to the first portion of the receiver.

8, A squelch circuit with noise burst prevention for use with a dual squelch receiver which includes a first portion adapted to receive a tone and audio modulated carrier signal, an audio portion for reproducing the audio signals, carrier squelch means responsive to received carrier signals to develop a first control signal after a time delay, tone coded squelch means responsive to received tone signals to develop a second control signal, and means coupling the carrier squelch means and the tone coded squelch means to the audio portion for enabling the same in response to either of said first and second control signals, said squelch circuit including control means coupled to the tone coded squelch means and responsive to the second control signal to develop an inhibit signal, and means coupling said control means to the carrier squelch means to render the same inoperative in response to said inhibit signal, said control means including delay means for holding the carrier squelch means inoperative for a period longer than the time delay of the carrier squelch means so that reproduction of noise during such time delay is prevented.

9. The squelch circuit of claim 8 wherein said control means includes a transistor having first and second electrodes and a control electrode, resistor means coupling said first electrode to said carrier squelch means, means coupling said second electrode to a reference potential, and means coupling said control electrode to said tone coded squelch means for receiving said second control signal, said transistor being responsive to said second control signal to be biased to provide conduction between said first and second electrodes to thereby couple said carrier squelch means to said reference potential through said resistor means.

10. The squelch circuit of claim 8 including hook switch means for selectively rendering said carrier squelch means operative and inoperative, said hook switch means being operative in the release position thereof to render said carrier squelch means operative.